United States Patent
Barowski et al.

[11] 3,894,797
[45] July 15, 1975

[54] PROJECTION UNIT, PARTICULARLY FOR TRANSPARENCIES

[75] Inventors: Karlheinz Barowski, Okriftel, Hattersheim; Kurt Schübel; Hans Weinhofer, both of Munich, all of Germany

[73] Assignees: Enna-Werk Optische Anstalt Dr. Appelt KG, Munich; Braun AG, Frankfurt am Main, both of Germany

[22] Filed: Sept. 24, 1973

[21] Appl. No.: 399,910

[30] Foreign Application Priority Data
Sept. 22, 1972 Germany.......................... 2246746

[52] U.S. Cl. .................... 353/30; 353/94; 353/119
[51] Int. Cl. .......................................... G03b 21/26
[58] Field of Search ................. 353/94, 30–37, 353/122, 119

[56] References Cited
UNITED STATES PATENTS
3,373,654  3/1968  Cavolam .............................. 353/94

FOREIGN PATENTS OR APPLICATIONS
414,877  8/1946  Italy ....................................... 353/30
708,439  5/1954  United Kingdom ................... 353/30

*Primary Examiner*—Richard E. Aegerter
*Assistant Examiner*—A. J. Mirabito
*Attorney, Agent, or Firm*—Sughrue, Rothwell, Mion, Zinn & Macpeak

[57] ABSTRACT

A projection unit for side by side or superimposed projection is disclosed wherein two projection devices are rotatably mounted within a housing in side by side relationship. Each projection device has optical system for projecting a picture onto a screen. The optical system in each projection unit is offset towards the adjacent projection unit. The projection units are interconnected by a linkage system which, upon rotation of one projection device, causes the other projection device to move through an equal angle in the opposite direction.

2 Claims, 5 Drawing Figures

PROJECTION UNIT, PARTICULARLY FOR TRANSPARENCIES

FIELD OF INVENTION

The invention raltes to a projection unit, particularly for projection of transparencies, which makes possible an alternate projection or a multiple projection of at least two transparencies.

BACKGROUND OF THE INVENTION

The alternate projection of a series of transparencies by means of two projectors requires their exact alignment on the projection screen available at the time before each projection, so that projected images, always equal in coverage, are projected from both projectors.

For multiple projection of transparencies or films, it is necessary to adjust the respective projectors hitherto required, corresponding to an arrangement which guarantees the projection image respectively to be produced by the multiple projection. The projectionist is hence also constrained to adjust the projectors afresh before each projection and to align them in a way meeting the aforesaid requirements on the projection screen at his disposal at the time.

SUMMARY OF THE INVENTION

The object of the invention is to facilitate the hitherto required preparations for the alternate projection of a series of transparencies by means of two projectors or for the multiple projection of transparencies or films, and moreover to reduce the considerable positioning surface hitherto required for these types of projection to a minimum by the production of a compact projection unit.

This object is accomplished by the projection unit according to the invention, which includes two projection components, each containing an illumination optics, a projections optics and a film or transparency guide system including the aperture, and a housing common to these components.

The projection unit according to the invention, because of the fixed assembly of the projection components belonging to it, saves a considerable part of the preparations required for alternate projection or for multiple projection, namely the adjustment of the individual projectors at the correct spacing relative to each other and from the projection screen for projection; this usually requires a positioning surface of considerable length, which is often not available, and which is no longer necessary for application of the projection unit according to the invention.

Advantageously, the projector components belonging to the projection unit are fitted in the housing common to them and lie side-by-side and in the same plane.

If only two projection units are associated with the projection unit, a mirror-imagewise similar construction of these components is of advantage insofar as their operation can be carried out from both the outer sides of the projection unit.

A further important advantage of this design of the projection components results from asymmetrical arrangement of the projection optics at the front side of the projection components and by an arrangement of the two mirror-imagewise similar projection components, in the housing common to them, in an arrangement which ensures as small as possible a mutual distance of the projection optics.

With this arrangement, the projection beams of the two projection components can approach each other to the extent that the parallax still remaining between the alternately projected images is reduced to a value which is no longer evident to the eye.

For complete prevention of such a parallax, the projection units, according to a further feature of the invention, are rotatably mounted in their common housing.

This is advantageously brought about by an adjustment device associated with one of the projection units and effecting the opposed rotation of both projection components through respectively equal angle from their initial position, which secures their mutually parallel projection axes.

The mirror-imagewise similar construction together with the asymmetric arrangement of the projection optics is also of advantage in the case of this design of the projection unit with rotatable projection components. Then, because of the resulting small mutual spacing of the two projection objectives, the mutual angle of pivoting of the two projection components required for elimination of the parallax is kept as small as possible, so that in this case also the distortion of the image resulting from the non-perpendicular impingement of the two projection beams on the plane of projection is no longer evident to the eye.

DESCRIPTION OF THE DRAWINGS

In the following, the subject of the invention is explained more fully, with the aid of the drawing, in an example of an embodiment. Schematically.

DETAILED DESCRIPTION OF PREFERRED EMBODIMENT

Figure 1:
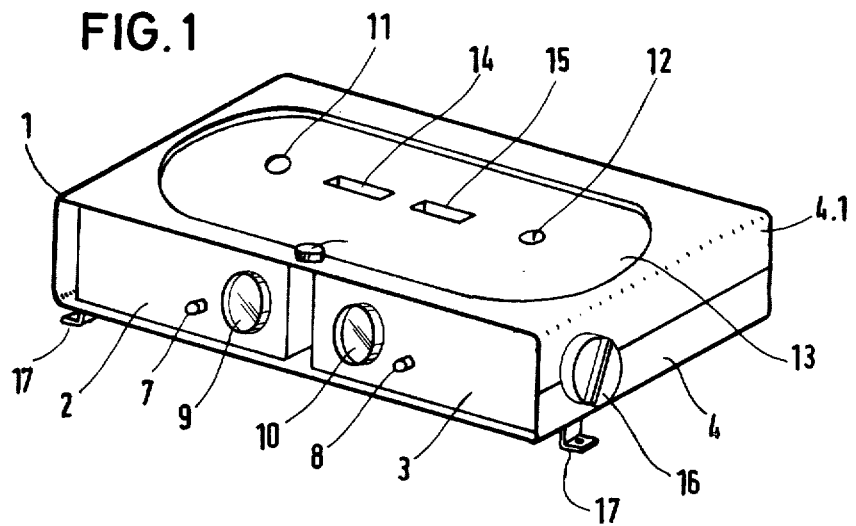
FIG. 1 is a perspective view of the projection unit.

The projection unit 1 shown in FIG. 1 consists substantially of two projection components 2 and 3 and housing 4 common to these components.

Figure 5:
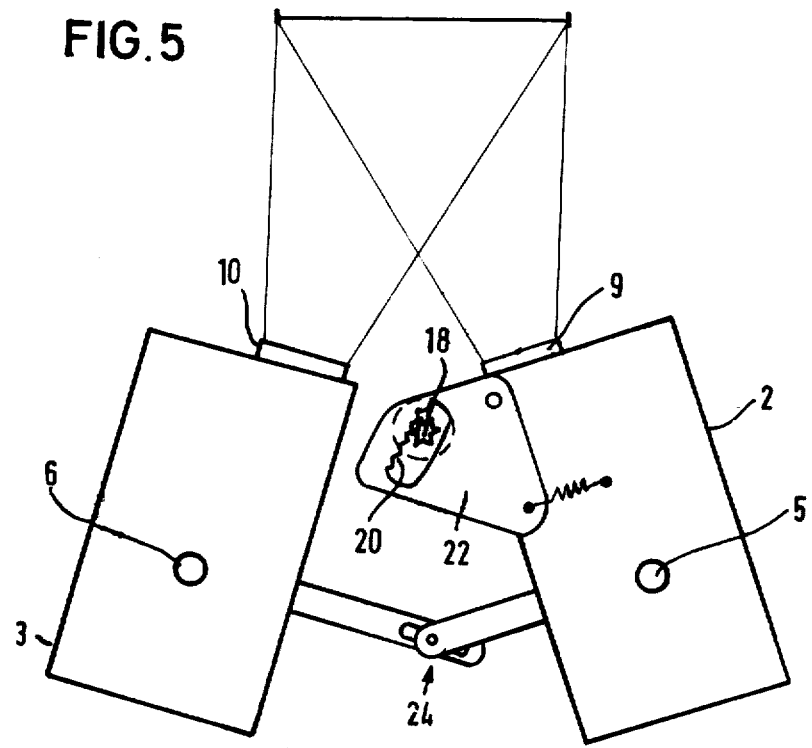
FIG. 5 shows it in the position ensuring superimposed projection.
Figure 4:
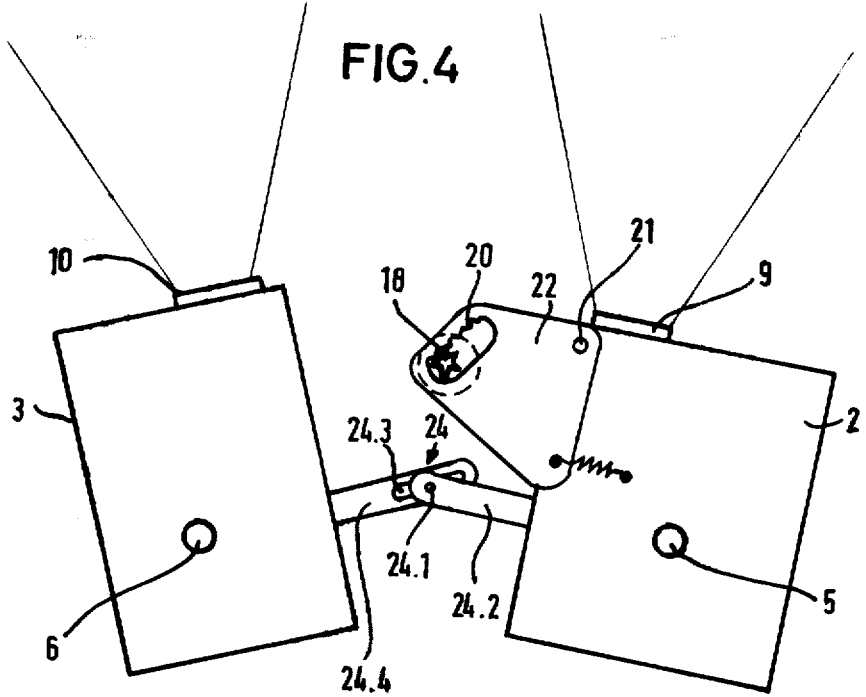
FIG. 4 shows the pivoting mechanism enabling mutual pivoting of both projection components, in the position ensuring side-by-side projection.

The two projection components 2 and 3, here arranged side-by-side in the same plane, are rotatably mounted at 5 and 6 in the housing 4 of the unit 1; see FIGS. 4 and 5. Their construction is mirror-imagewise. As a result of this, their asymmetrically arranged projection optics 9 and 10, which can be focussed by hand adjusters 7 and 8, have a small as possible a spacing from each other, as a result of which — as already explained — the parallax between the alternately projected images, or the distortion of the projected images brought about by the mutual pivoting of the projection components, is kept as small as possible during alternate projection with equal coverage.

The mounting shafts 5 and 6 for the two projection components 2 and 3 in their common housing 4 are in alignment with the axes of rotation 11 and 12 of two compartmented magazines (not shown), which are insertable into a recess 13 of the upper part 4.1 of the housing 4 of the projection unit and cooperate with a transparency changer associated with each projection component, for a stepwise advance of the magazine from compartment to compartment. The next transparency to be projected is dropped from the magazine compartment above the drop shaft into the projection position by drop shafts 14 and 15, by means of the transparency changer elements associated with the two projection components 2 and 3, and after projection is returned by lifting back into this magazine compartment.

Such compartmented magazines are well known in the art and, per se, form no part of the invention. Any means capable of placing the transparencies in drop shafts 14 and 15 may be utilized.

A rotary knob 16 projecting laterally out of the housing 4 serves to raise the whole projection unit including the projection units 2 and 3 associated with it; this can for example be effected by a radially acting cam disc on the shaft of this rotary knob, by which two feet 17 belonging to the front side of the projection unit are displaced vertically.

Figure 2:
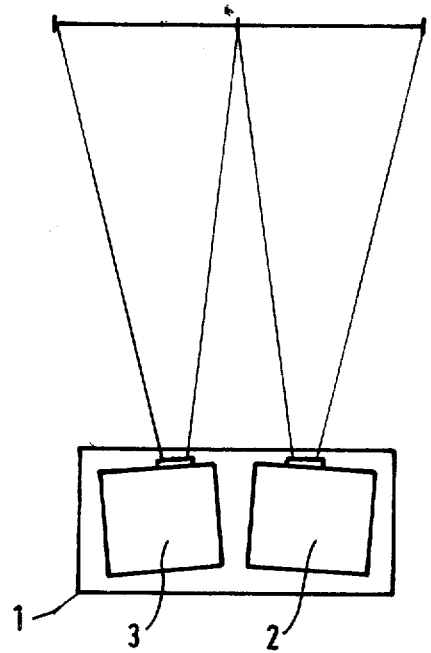
FIG. 2 shows the position of the two projection components of the projection unit required for side-by-side projection.
Figure 3:
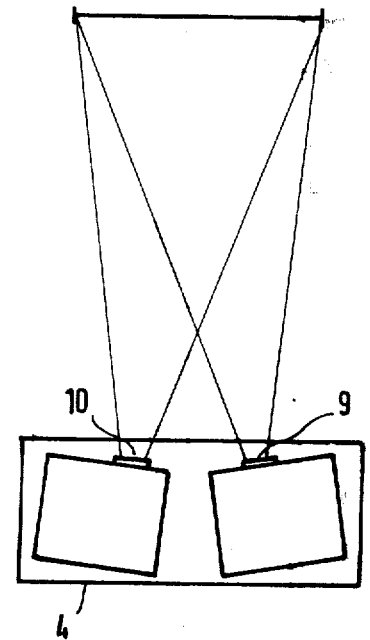
FIG. 3 shows the position of these projection components required for superimposed projection.

As can be seen from FIGS. 2 and 3, the two projection components 2 and 3 of the unit 1 can be rotated within the housing 4 to the extent that the axes of the projection beams produced by their optics 9 and 10 diverge for side-by-side projection (FIG. 2) and converge for superimposed projection (FIG. 3). By superimposed projection is primarily to be understood that alternate projection of a series of transparencies by means of both projector components 2 and 3.

The mutual rotation of the two projection components from the position of FIG. 2 into the position of FIG. 3 is brought about by a common displacement device, which is shown in FIGS. 4 and 5.

This displacement device includes a toothed wheel drive 18 mounted in the housing 4 of the projection unit 1, for operation by a handle 19 (FIG. 1) projecting out of the upper part 4.1 of the housing. The toothed wheel drive 18 is in engagement with a rack 20, which is part of a plate 22, here hinged to the projection unit 2 at 21. The plate 22 is held always in the position for engagement of rack 20 and toothed wheel drive 18 by a tension spring 23 which pivots it counterclockwise by a small amount.

By counterclockwise rotation of the toothed wheel drive 18, the projection component 2 is pivoted about its mounting 5 in the same direction of rotation. This pivoting motion is transmitted to the projection component 3 via a link 24, fitted between the projection components 2 and 3, and here constituted by a driven bolt 24.1 on the drive arm 24.2 belonging to the projection component 2 and by a slide guide 24.3, which cooperates with the bolt 24.1, on the drive arm 24.4 belonging to the projection component 3. The transmission is such that clockwise pivoting of the projection component 3 through a respectively equal angular measure results from the counterclockwise pivoting of the projection component 2.

By means of the displacement device, the two projection components 2 and 13 are consequently, as in FIGS. 4 and 5, pivoted in common in opposite directions, from their position which ensures side-by-side projection into their position which ensures superimposed projection, by the rotation of the toothed wheel drive 18 by means of the handle 19. The components 2 and 3 are, naturally, pivoted back into their position which ensures side-by-side projection (FIG. 4) by clockwise rotation of the toothed wheel drive 18.

We claim:

1. A projection unit for side by side or superimposed projection comprising,
   a. an outer housing,
   b. at least two projection devices rotatably mounted within said housing, disposed in a side by side relationship, each projection device having optical means for projecting a picture, the axis of each of said optical means being offset from a central axis of its projection device parallel to the optical means axis, in a direction toward the adjacent projection device, and
   c. means connected to one of said projection devices to rotate said one projection device; and
   d. means interconnecting said one projection device with said other projection device so as to cause said other projection device to rotate through an equal angle, but in an opposite direction from said one projection device.

2. The projection unit of claim 1 wherein said means for rotating said one projection device comprises:
   a. a toothed wheel rotatably attached to said housing, and
   b. a rack engaging said toothed wheel and attached to said one of said projecting devices.

* * * * *